(12) United States Patent
Swanson

(10) Patent No.: US 10,807,327 B2
(45) Date of Patent: Oct. 20, 2020

(54) SYSTEMS AND METHODS FOR ATTACHING TO A SURFACE AND APPLYING A CALIBRATED LOAD

(71) Applicant: The Boeing Company, Chicago, IL (US)

(72) Inventor: Gregory Wendel Swanson, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 183 days.

(21) Appl. No.: 15/987,031

(22) Filed: May 23, 2018

(65) Prior Publication Data

US 2019/0358917 A1    Nov. 28, 2019

(51) Int. Cl.
| | | |
|---|---|---|
| B32B 41/00 | (2006.01) | |
| B29C 73/12 | (2006.01) | |
| B29L 31/30 | (2006.01) | |
| B64F 5/10 | (2017.01) | |

(52) U.S. Cl.
CPC ....... *B29C 73/12* (2013.01); *B29L 2031/3085* (2013.01); *B64F 5/10* (2017.01)

(58) Field of Classification Search
CPC ......... B29C 73/12; B29C 73/34; B29C 73/30; B64F 5/10; B29L 2031/3085
USPC ............................ 156/64, 350, 351, 378, 379
See application file for complete search history.

(56) References Cited

U.S. PATENT DOCUMENTS 6,105,896 A * 8/2000 Westrich ................ B65H 54/52
                                                    242/474.4
6,450,228 B1 * 9/2002 McLeod ................ B29C 63/044
                                                      156/350

OTHER PUBLICATIONS

Facom webcatalogue, Set of 6 Suction Cups DCR.20J6, https://catalogue.facom.com/no-en/categorie/automotive/bodywork/windshields/windshield-tools/produit/set-of-6-suction-cups/dcr-20j6-1, 1 page, printed from the World Wide Web on Apr. 27, 2018.
Gunson Suction Clamps—Set of 6, 77081TC, http://www.gunsonshop.com/contents/en-us/p223_Gunson_Suction_Clamps_-_Set_of_6.html, 5 pages, printed from the World Wide Web on Apr. 27, 2018.

* cited by examiner

*Primary Examiner* — Michael N Orlando
*Assistant Examiner* — Joshel Rivera
(74) *Attorney, Agent, or Firm* — McDonnell Boehnen Hulbert & Berghoff LLP

(57) ABSTRACT

Systems and methods for attaching to a surface and applying a calibrated load are described. An example system for attaching to a surface and applying a calibrated load includes a suction cup to attach to an attachment surface and a rocker arm to apply a load to a working surface. The rocker arm is coupled to the suction cup and comprises a portion extending over the suction cup to apply pressure over the suction cup. The system also includes a force scale coupled to the rocker arm to provide an indication of an amount of the load applied to the working surface by the rocker arm.

20 Claims, 6 Drawing Sheets

SYSTEMS AND METHODS FOR ATTACHING TO A SURFACE AND APPLYING A CALIBRATED LOAD

GOVERNMENT LICENSE RIGHTS

This invention was made with Government support under contract number FA8611-04-C-2851 awarded by the Department of Defense (United States Air Force). The Government has certain rights in this invention.

FIELD

The present disclosure relates generally to systems and methods for applying load and, more particularly, to systems and methods for attaching to a surface and applying a calibrated load.

BACKGROUND

Production or repair of aircraft equipment often involves a curing process (e.g., composite and/or adhesive cure). The curing process often involves applying a load to a surface of the aircraft, so as to apply pressure to the area being cured. One conventional approach of applying load during a curing process is surrounding the area to be cured with a vacuum bag and applying load with the vacuum bag process. Another conventional approach of applying load during a curing process involves using a weight(s) to apply load to the area to be cured. Yet another conventional approach of applying load during a curing process is applying tape to the area being cured.

The conventional approaches for applying load during a curing process, however, have numerous drawbacks. For instance, in some cases, the surface upon which load is to be applied can be uneven due to the aircraft geometry, and vacuum bags often suffer from air leaks due to the this uneven geometry. Thus, in many cases, vacuum bags are unable to maintain a sufficient vacuum to apply the desired load. An example drawback of a repair device utilizing weights is that there may be no suitable features on the aircraft surface to which to attach and securely mount the repair device. Thus, in many cases, repair devices utilizing weights are unable to be attached and secured to the aircraft surface so as to apply the desired load. An example drawback of tape is that the tape may not provide enough pressure to apply the desired load.

Another drawback of these conventional approaches is that they do not provide an indication of the amount of load provided. Therefore, in these conventional approaches it is difficult to ensure that the desired load is provided and/or maintained during the curing process.

In view of the foregoing, there is a need for improved systems and methods for attaching to a surface and applying load. Particularly, there is a need for systems and methods that can attach to uneven surfaces for which vacuum bags are unsuitable. Further, there is a need for systems and methods that can attach to surfaces that are not suitable for securing and mounting conventional repair devices utilizing weights. There is also a need for systems and methods for providing a visual indication of an amount of the applied load.

SUMMARY

In one example, a system for attaching to a surface and applying a calibrated load is described. The system includes a suction cup to attach to an attachment surface and a rocker arm to apply a load to a working surface. The rocker arm is coupled to the suction cup and comprises a portion extending over the suction cup to apply pressure over the suction cup. The system also includes a force scale coupled to the rocker arm to provide an indication of an amount of the load applied to the working surface by the rocker arm.

Within examples, the rocker arm comprises a pressure foot to abut the working surface, wherein the pressure foot is positioned on a first end of the rocker arm, and wherein the force scale is attached to a second end of the rocker arm.

Within examples, the force scale comprises a pressure foot to abut the working surface.

Within examples, the force scale comprises a foot, a compression spring, a sliding block, and an adjustment screw to force the sliding block to compress the compression spring when the foot abuts a contact surface. An amount of compression of the compression spring is correlated with the amount of the load applied to the working surface by the rocker arm.

Within examples, the sliding block is threadedly attached to the adjustment screw.

Within examples, the force scale comprises a main body having at least one indicator line positioned on the main body to indicate an amount of applied load. The sliding block is moveable relative to the main body, and the sliding block comprises an indicator pin to show a position of the sliding block relative to the at least one indicator line.

Within examples, the foot comprises a swivel foot to abut contact surfaces of different angles.

Within examples, the force scale is hingedly attached to the rocker arm.

Within examples, the portion of the rocker arm extending over the suction cup extends substantially parallel to a main axis of the suction cup, such that the portion extending over the suction cup applies pressure substantially perpendicular to the suction cup when the load is applied to the working surface by the rocker arm.

Within examples, the system further comprises (i) an air hose plug to attach to a pressurized air source and (ii) a body to provide an airflow path from the air hose plug to the suction cup, whereby air flowing through the body generates a vacuum for the suction cup.

Within examples, the system further comprises vacuum bag seal material applied to outer edges of the suction cup.

In another example, a system is described that includes a plurality of systems for attaching to a surface and applying a calibrated load. Each system for attaching to a surface and applying a calibrated load comprises: (i) a suction cup to attach to an attachment surface; (ii) a rocker arm to apply a load to a working surface, wherein the rocker arm is coupled to the suction cup and comprises a portion extending over the suction cup to apply pressure over the suction cup; and (iii) a force scale coupled to the rocker arm to provide an indication of an amount of the load applied to the working surface by the rocker arm. The system also includes at least one air hose plug to attach to a pressurized air source.

Within examples, the system further comprises a body to provide an airflow path from the at least one air hose plug to each of the suction cups, wherein the at least one air hose plug is attached to the body.

Within examples, each force scale comprises a foot, a compression spring, a sliding block, and an adjustment screw to force the sliding block to compress the compression spring when the foot abuts a contact surface. An amount of compression of the compression spring is correlated with the amount of the load applied to the working surface by the rocker arm.

Within examples, the force scale further comprises a main body having at least one indicator line positioned on the main body to indicate an amount of applied load. The sliding block is moveable relative to the main body, and the sliding block comprises an indicator pin to show a position of the sliding block relative to the at least one indicator line.

Within examples, the force scale is hingedly attached to the rocker arm.

Within examples, for each system for attaching to a surface and applying a calibrated load, the portion of the rocker arm extending over the suction cup extends substantially parallel to a main axis of the suction cup, such that the portion extending over the suction cup applies pressure substantially perpendicular to the suction cup when the load is applied to the working surface by the rocker arm.

Various examples of the system(s) described herein may include any of the components, features, and functionalities of any of the other examples of the system(s) described herein in any combination.

In another example, a method for applying a load to an uneven surface is described. The method includes suctioning a rocker arm to an attachment surface of the uneven surface, wherein the rocker arm comprises a pressure foot to apply pressure to a working surface of the uneven surface. The method also includes applying a load to the working surface with the pressure foot. The method also includes providing a visual indication of an amount of the load applied to the working surface by the pressure foot.

Within examples, suctioning a rocker arm to an attachment surface of the uneven surface comprises (i) a suction cup attaching to the attachment surface and (ii) a pressurized air source generating a vacuum for the suction cup.

Within examples, the method further comprises adjusting the applied load until the visual indication indicates that the applied load is at least a threshold level.

Various examples of the method(s) described herein may include any of the components, features, and functionalities of any of the other examples of the method(s) described herein in any combination.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

As mentioned above, current systems and methods for applying load to a surface have a number of drawbacks. The methods and systems in accordance with the present disclosure provide improved methods and systems for applying load to a surface. In one example, a system for attaching to a surface and applying a calibrated load is described. The system includes a suction cup to attach to an attachment surface and a rocker arm to apply a load to a working surface. The rocker arm is coupled to the suction cup and includes a portion extending over the suction cup to apply pressure over the suction cup. The system also includes a force scale coupled to the rocker arm to provide an indication of an amount of the load applied to the working surface by the rocker arm. The disclosed system beneficially provides an improved system that is capable of attaching to uneven surfaces for which a vacuum bag is not appropriate. Further, the disclosed system can attach to substantially any surface to which the suction cup can attach, and thus the disclosed system can attach to surfaces that are not suitable for securing and mounting repair devices utilizing weights. Still further, the disclosed system provides a visual indication of the applied load, which can help to ensure that the desired load is applied and/or maintained.

Figure 1A:
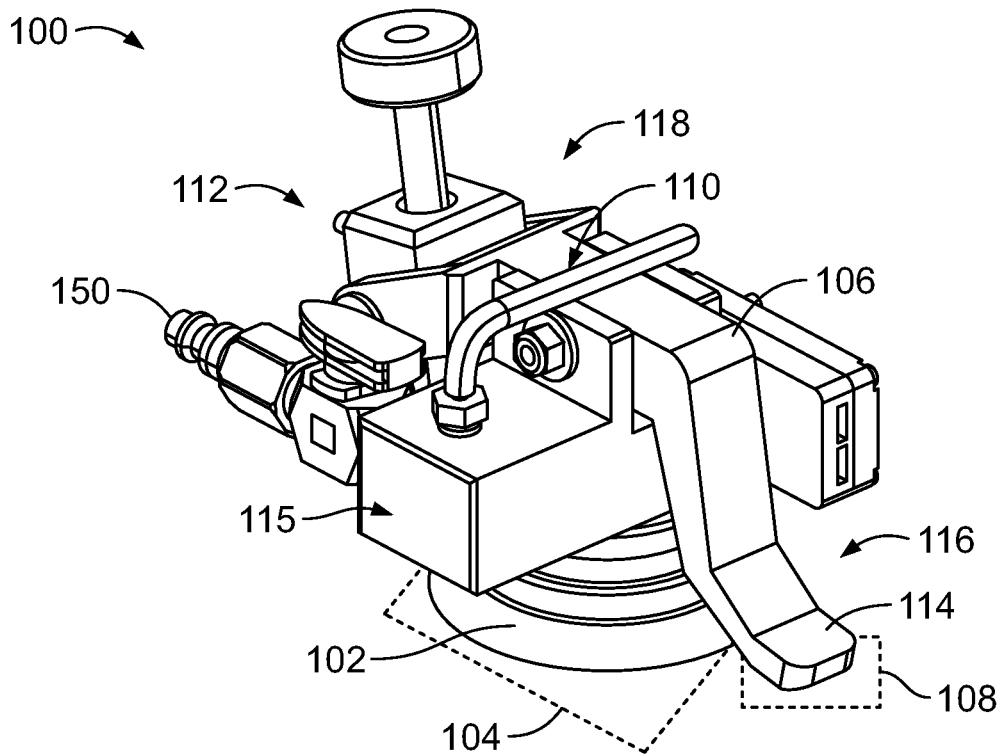
FIG. 1A illustrates a perspective view of a system for attaching to a surface and applying a calibrated load, according to an example implementation.
Figure 1B:
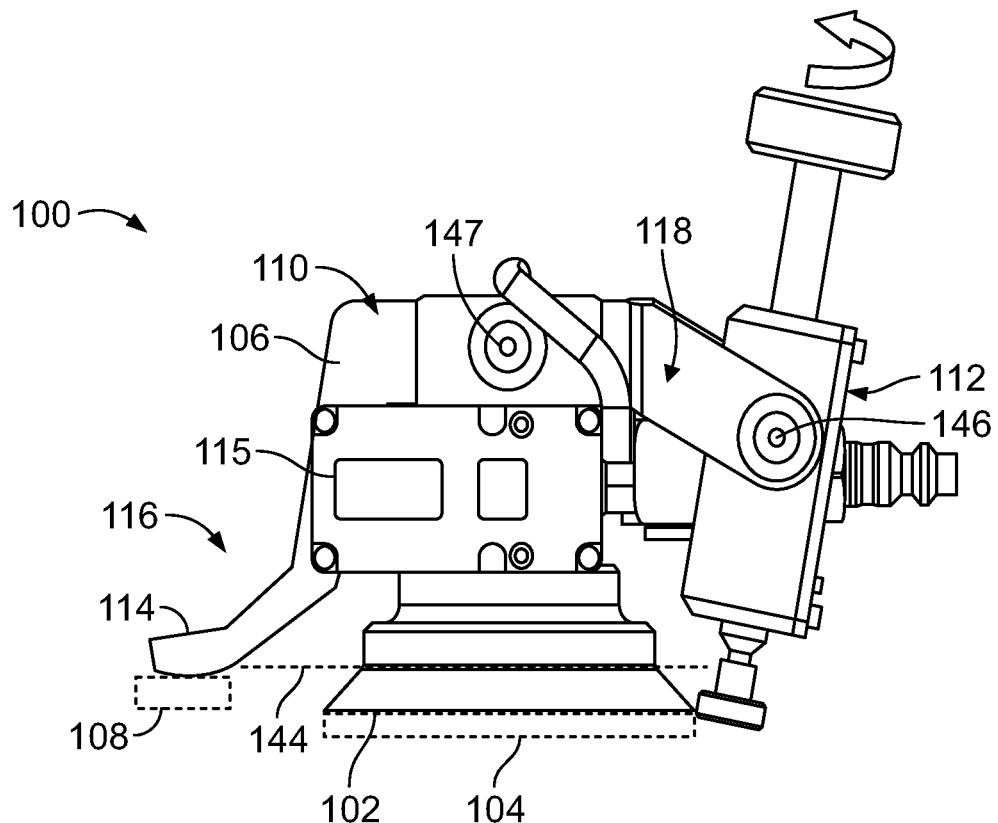
FIG. 1B illustrates a side view of the system of FIG. 1A, according to an example implementation.

Referring now to FIGS. 1A-B, a system 100 for attaching to a surface and applying a calibrated load is illustrated, according to an example implementation. The system 100 includes a suction cup 102 to attach to an attachment surface 104. The system 100 also includes a rocker arm 106 to apply a load to a working surface 108. The rocker arm 106 is coupled to the suction cup 102 and comprises a portion 110 extending over the suction cup 102 to apply pressure over the suction cup 102. The system 100 also includes a force scale 112 coupled to the rocker arm 106 to provide an indication of an amount of the load applied to the working surface 108 by the rocker arm 106.

Within examples, the suction cup 102 and/or the force scale 112 are directly attached to the rocker arm 106. These components may be directly attached to one another in any suitable way, including but not limited to being joined together with any suitable fastener (e.g., bolts, rivets, nuts, and/or nails), via welding, and/or with an adhesive. Within other examples, the suction cup 102 and/or the force scale 112 are attached to the rocker arm 106 via one or more other components. For instance, in the example of FIGS. 1A-B, suction cup 102 is attached to the rocker arm via body 115.

The components of system 100 may be made from any suitable materials. Within examples, the rocker arm 106 and force scale 112 comprise metal and/or plastic. Within examples, the suction cup 102 comprises an elastomer including but not limited to rubber, neoprene, silicone, nitrile, viton, vinyl and/or urethane. Other example materials for the components of system 100 are possible as well.

The working surface 108 may be any area upon which pressure is to be applied, and the attachment surface 104 may be any area near the working surface 108 to which the suction cup 102 can suction. In general, the attachment surface 104 and/or working surface 108 may be oriented at any angle. For instance, the attachment surface 104 and/or working surface 108 may be parallel or substantially parallel to the ground, perpendicular or substantially perpendicular to the ground, or any orientation there between. Further, the attachment surface 104 and/or working surface 108 may be the top, bottom, or side of a structure. For instance, within examples, the attachment surface 104 and/or working surface 108 is the top of an aircraft wing, the side of aircraft wing, or the underside of the aircraft wing.

Furthermore, within examples, the working surface 108 is not even with the attachment surface 104. For instance, the working surface 108 and the attachment surface 104 may have different heights and/or angles relative to one another. Within other examples, the working surface 108 is even or substantially even with the attachment surface 104. Within other examples, the attachment surface 104 is itself an uneven surface. Within other examples, the working surface 108 is itself an uneven surface.

As explained above, production or repair of aircraft equipment often involves a curing process (e.g., a composite and/or adhesive cure), and pressure is applied during the curing process. Within examples, the working surface 108 is an area of an aircraft that is undergoing a curing process. Within examples, a caul plate(s) may help to evenly distribute load over the area being cured. Therefore, within examples, the working surface 108 comprises a caul plate. Within other examples, a caul plate(s) is not used and the working surface 108 may be the surface of the aircraft itself. Other example working surfaces are possible as well.

Returning to FIGS. 1A-B, the rocker arm 106 includes a pressure foot 114 to abut the working surface 108. The pressure foot 114 is positioned on a first end 116 of the rocker arm 106, and the force scale 112 is attached to a second end 118 of the rocker arm 106. The rocker arm 106 applies a calibrated load to the working surface 108 when the pressure foot 114 abuts the working surface 108. The force scale 112 provides a visual indication of the calibrated load applied by the pressure foot 114.

Figure 2A:
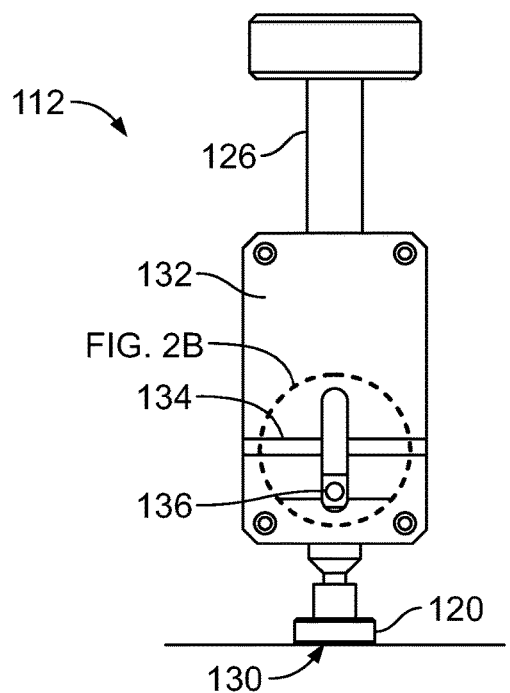
FIG. 2A illustrates a front view of an example force scale, according to an example implementation.
Figure 2B:
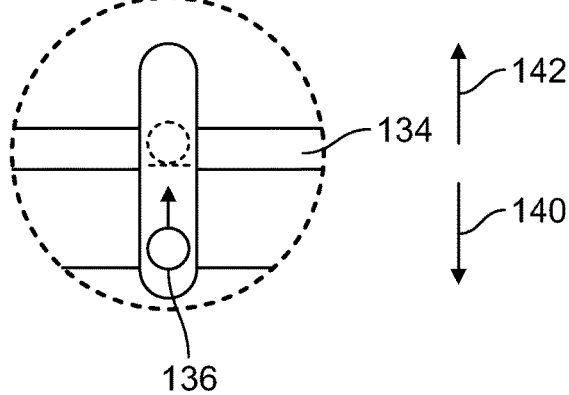
FIG. 2B illustrates a close-up view of an indicator pin and indicator line of the force scale of FIG. 2A, according to an example implementation.
Figure 3:
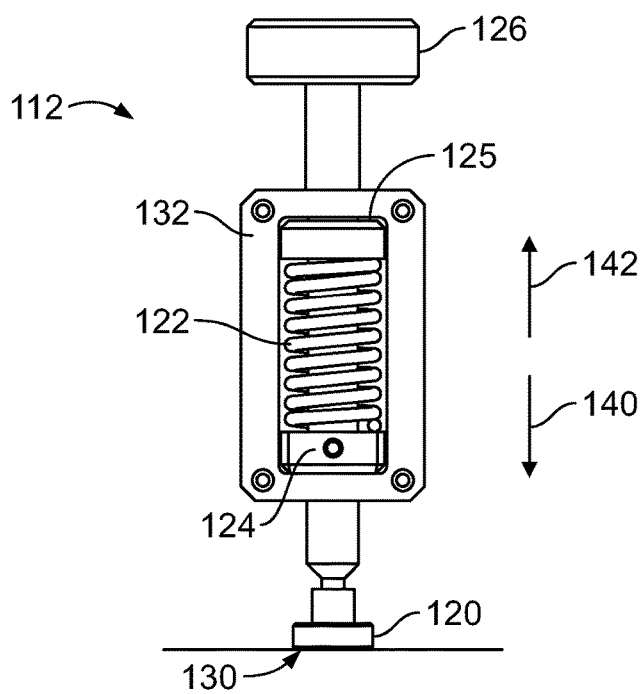
FIG. 3 illustrates a cross-sectional view of an example force scale, according to an example implementation.

With reference to FIGS. 2-3, the force scale 112 includes a foot 120, a compression spring 122 (see FIG. 3), a sliding block 124 (see FIG. 3), a guide block 125 (see FIG. 3), and an adjustment screw 126 to force the sliding block 124 to compress the compression spring 122 when the foot 120 abuts a contact surface 130. An amount of compression of the compression spring 122 is correlated with the amount of the load applied to the working surface 108 by the rocker arm 106. Therefore, the position of the sliding block 124 relative to the at least one indicator line 134 provides an indication of a calibrated load. Within examples, the sliding block 124 is formed from nickel-aluminum-bronze material.

The contact surface 130 may be any area against which the foot 120 may be positioned. Within examples, the contact surface 130 is not even with the attachment surface 104. However, within other examples, the contact surface 130 is even or substantially even with the attachment surface 104.

The force scale 112 also includes a main body 132 having at least one indicator line 134 positioned on the main body 132 to indicate an amount of applied load (see FIG. 2A). The sliding block 124 is moveable relative to the main body 132, and the sliding block 124 comprises an indicator pin 136 to show a position of the sliding block 124 relative to the at least one indicator line 134. FIG. 2B illustrates a close-up view of the indicator pin 136 moving relative to the at least one indicator line 134.

Within examples, indicator pin 136 extends from the sliding block 124 through a slot in main body 132. This allows an operator to be able to easily see the location of the indicator pin 136 relative to the at least one indicator line 134.

In operation, a user may turn (e.g., to the right) the adjustment screw 126 until the foot 120 abuts the contact surface 130. Within examples, when the foot 120 is not yet in contact with the contact surface 130 and the adjustment screw 126 is rotated, the adjustment screw 126 moves in the distal direction 140 through the main body 132 and causes the foot 120 to move in the distal direction 140 towards the contact surface 130. Within examples, when the foot 120 abuts the contact surface 130, the user may continue to turn (e.g., to the right) the adjustment screw 126. This rotation of adjustment screw 126 will increase pressure of the rocker arm 106 (via foot 120) against the contact surface 130. Since the rocker arm 106 is coupled to force scale 112 and the suction cup 102 provides a vacuum securing the system 100 to the attachment surface 104, the increased pressure of the rocker arm 106 against the contact surface 130 causes a corresponding amount of pressure of the rocker arm 106 (via pressure foot 114) against the working surface 108. Therefore, the rotation of adjustment screw 126 will increase the load applied to the working surface 108 by the rocker arm 106. Rotation of the adjustment screw 126 in the opposite direction (e.g., to the left) may decrease the load applied.

Returning to FIG. 1B, within examples, the portion 110 of the rocker arm 106 extending over the suction cup 102 extends substantially parallel to a main axis 144 of the suction cup 102. As a result, the portion 110 extending over the suction cup 102 applies pressure substantially perpendicular to the suction cup 102 when the load is applied to the working surface 108 by the rocker arm 106. Beneficially, this ensures that the force on the suction cup 102 is pure or substantially pure tension (instead of peel off). Within examples, extending substantially parallel to main axis 144 means that the longitudinal axis of the portion 110 is angled within about 1 degree or less of the main axis 144 (e.g., about 0.1, 0.2, 0.3, 04, 0.5, 0.6, 0.7, 0.8, 0.9, or 1 degree(s)). Similarly, within examples, applying pressure substantially perpendicular to the suction cup 102 means that the force vector of the pressure applied by the portion 110 has a direction that is within about 1 degree or less of a line normal to the main axis 144 (e.g., about 0.1, 0.2, 0.3, 04, 0.5, 0.6, 0.7, 0.8, 0.9, or 1 degree(s)).

Within other examples, the portion 110 of the rocker arm 106 can rotate relative to the main axis 144. For instance, within examples the portion 110 of rocker arm 106 can rotate via hinge 147 (see FIG. 1B) about +/−5 degrees relative to the main axis 144. Other example degrees are possible as well. This adjustability provided by the rotation via hinge 147 may help to accommodate situations when the system 100 is used on uneven surfaces.

With reference to FIG. 3, the sliding block 124 and the guide block 125 are threadedly attached to the adjustment screw 126. The sliding block 124 is moveable relative to the main body 132, whereas the guide block 125 is fixed to the main body. As the adjustment screw 126 is turned and the amount of load applied increases, the sliding block 124 moves in proximal direction 142 through the main body 132 and compresses the compression spring 122. The amount of applied load can be determined based on the spring constant of the compression spring 122 and the distance that the compression spring 122 is compressed. The at least one indicator line 134 may be positioned at a suitable location on the main body 132 to provide the calibrated indication of the amount of applied load.

In the example of FIGS. 2-3, the at least one indicator line 134 is a single indicator line that indicates a threshold load. Therefore, when the indicator pin 136 is aligned with (or above) the at least one indicator line 134, an operator will have a visual indication that the threshold load (or higher) is being applied and/or maintained. In an example, the threshold load is between about 5 Newtons (N) and 15 N. Of course, other threshold loads are possible.

Within other examples, the at least one indicator line 134 includes a plurality of indicator lines to indicate a plurality of amounts of applied loads. As a particular example, the plurality of indicator lines may comprise lines indicating 1 N, 5 N, 10 N, 15 N, 20 N, and 25 N. Other example indicated amounts and granularity of indicated amounts are of course possible as well. In practice, the indicated amounts and granularity of indicated amounts may depend on the geometry of the suction cup(s) and/or rocker arm length(s). Within other examples, the force scale 112 comprises a digital display that digitally displays the indication of the amount of load applied.

Although in the example of FIGS. 2-3 the sliding block 124 includes an indicator pin 136 that extends through a slot in the main body 132, within other examples other indicators are possible as well. For instance, rather than including a pin, the sliding block 124 may be colored so as to easily be seen through the slot in the main body 132. Other examples are possible as well.

In the example of FIGS. 2-3, adjustment screw 126 is a thumb screw. A thumb screw may allow an operator to easily grip and twist the adjustment screw 126 to adjust the amount of applied load. Within other examples, the adjustment screw 126 is configured to be adjusted by a tool including but not limited to a screwdriver or a wrench.

Within examples, the foot 120 is a swivel foot to abut contact surfaces of different angles. A swivel foot allows the foot 120 to change angle based on the angle of the contact surface 130. As a result, the foot 120 can sit flush with the contact surface 130 even if the main body 132 of force scale 112 is not perpendicular or substantially perpendicular to the contact surface 130 when the load is applied. This ability to abut contact surfaces of different angles may help to accommodate situations when the system 100 is used on uneven surfaces.

Within examples, the force scale 112 is hingedly attached to the rocker arm 106. For instance, with reference to FIG. 1B, the system 100 includes hinge 146. Force scale 112 can be rotated about this hinge 146 to various angles. This adjustability may also help to accommodate situations when the system 100 is used on uneven surfaces. For instance, this adjustability may help the system 100 in situations where the attachment surface 104 is not even with the contact surface 130.

Returning to FIGS. 1A-B, the system 100 also includes an air hose plug 150 to attach to a pressurized air source. Body 115 provides an airflow path from the air hose plug 150 to the suction cup 102. Air from a pressurized air source attached to the air hose plug 150 flows through the body 115 to generate and/or maintain a vacuum for the suction cup 102. Within examples, body 115 acts as a venturi. In practice, curing processes may take various amounts of time. For instance, a curing process may take minutes, an hour(s), a day(s), or more. The attachment to a pressurized air source may help to maintain the vacuum for the suction cup 102 throughout the entire curing process, even when the process takes hours, days, or more.

The pressure foot 114 may be shaped and angled to reach any desired area upon which pressure is to be applied. Within examples, the rocker arm 106 is designed so as to allow the system 100 to apply pressure to areas that may be difficult to reach. For instance, the pressure foot 114 of the rocker arm 106 may be shaped and angled to reach under a structure(s) to apply pressure to an area under that structure(s).

Figure 4:
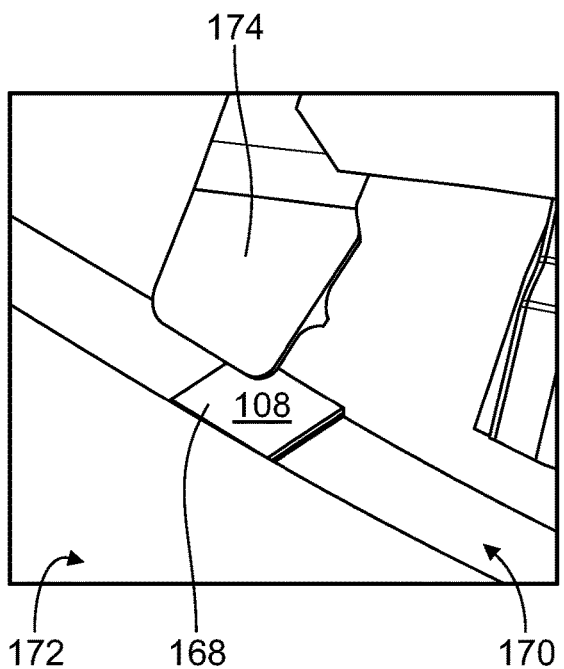
FIG. 4 illustrates an example attachment surface and an example working surface, according to an example implementation.
Figure 5:
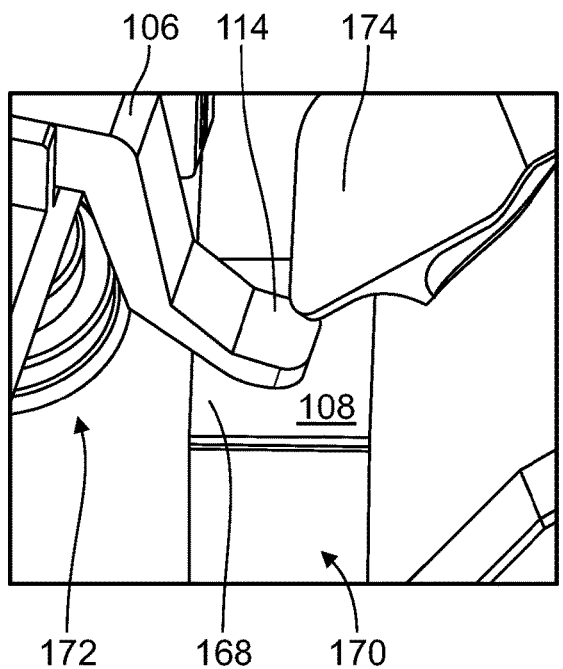
FIG. 5 illustrates a suction cup attached to the attachment surface of FIG. 4 and a rocker arm applying load to the working surface of FIG. 4, according to an example implementation.

FIGS. 4-5 illustrate an example situation where the pressure foot 114 reaches underneath a structure to apply pressure to an area under that structure. In particular, FIG. 4 illustrates an example where a working surface 108 is a caul plate 168 placed over a wear strip 170 on a body 172 of an aircraft. FIG. 5 illustrates the suction cup 102 attached to body 172, and pressure foot 114 of rocker arm 106 applies pressure to the caul plate 168 during a curing process. The caul plate 168 is positioned below protuberance 174, and the pressure foot 114 is shaped and angled to reach underneath this protuberance 174 to apply the pressure to the caul plate 168. Other shapes and angles of the pressure foot 114 are possible as well. This customization of the pressure foot 114 also helps to allow to system 100 to apply pressure in situations where the working surface 108 is not even with the attachment surface 104.

Although in the example of FIGS. 1A-5, the rocker arm 106 includes a pressure foot 114 to abut the working surface 108, in other examples the force scale 112 includes the pressure foot to abut the working surface 108. For instance, within examples the foot 120 is the pressure foot that abuts the working surface 108. In these examples, the contact surface 130 and the working surface 108 are the same surface.

Figure 6:
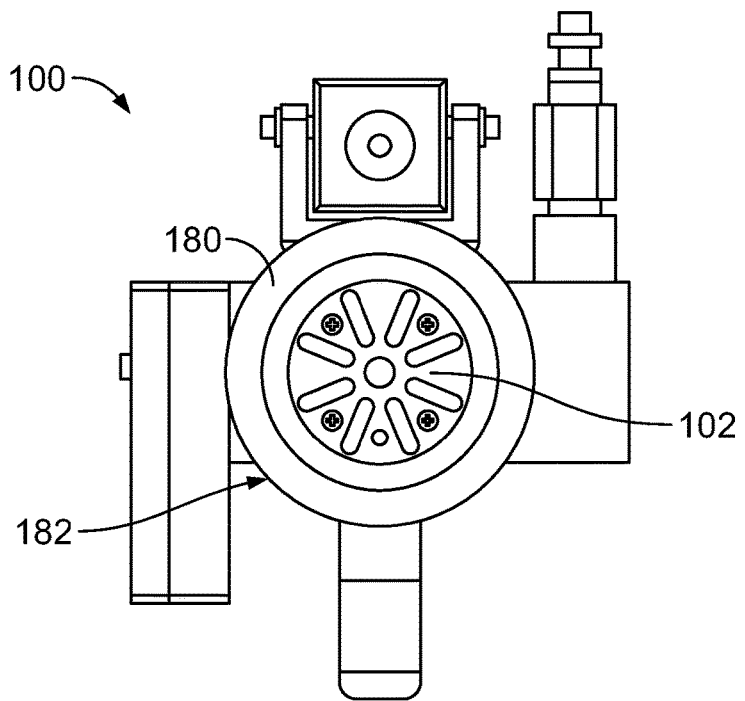
FIG. 6 illustrates an example suction cup with vacuum bagging seal material applied to outer edges of the suction cup, according to an example implementation.

Within examples, vacuum bagging seal material is applied to outer edges of the suction cup. For instance, FIG. 6 illustrates system 100 wherein vacuum bag seal material 180 is applied to the outer edge 182 of suction cup 102. Within examples, the vacuum bagging seal material is a sealant tape that comprises synthetic rubber. In practice, the attachment surface 104 may include various features that make the attachment surface 104 uneven. For instance, the attachment surface 104 may include one or more fasteners (e.g., bolts, rivets, nuts, and/or nails) that make the attachment surface 104 uneven. As a particular example, aircraft surfaces often include rivets, and vacuum bag seal material 180 may not only help the suction cup 102 establish suction to attachment surfaces that include rivets, but also to maintain a vacuum for extended period of time.

Figure 7:
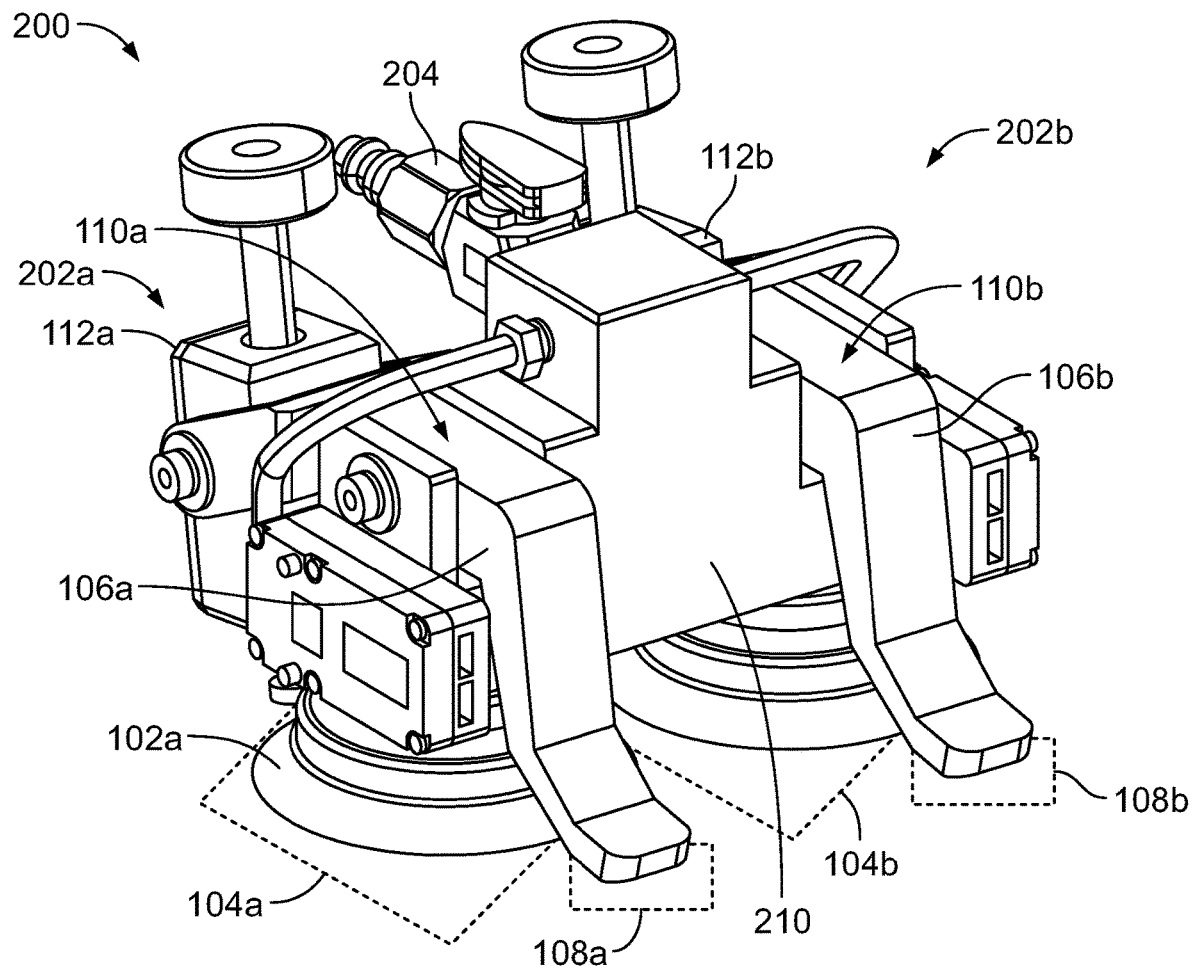
FIG. 7 illustrates a perspective view of a system, according to an example implementation.

In the example of FIGS. 1A-B, the system 100 is configured to apply pressure at a single point defined by pressure foot 114. However, within other examples, the disclosed system may be configured to provide pressure at a plurality of different points. FIG. 7 illustrate an example of a system 200 that is configured to provide pressure at a plurality of different points.

The system 200 includes a plurality of systems for attaching to a surface and applying a calibrated load. Within examples, systems 202a-b are each the same as or similar to system 100 of FIGS. 1A-B. For instance, as shown in FIG. 7, systems 202a-b comprise suction cups 102a-b to attach to attachment surfaces 104a-b and rocker arms 106a-b to apply a load to working surfaces 108a-b. The rocker arms 106a-b are attached to suction cups 102a-b and comprise portions 110a-b extending over suction cups 102a-b to apply pressure over the suction cups. Systems 202a-b also include force scale 112a-b coupled to the rocker arms 106a-b to provide an indication of an amount of the load applied to the working surfaces 108a-b by the rocker arms 106a-b.

System 200 also includes at least one air hose plug 204 to attach to a pressurized air source. The at least one air hose plug 204 is attached to a body 210. The body 210 provides an airflow path from the at least one air hose plug 204 to each of the suction cups 102a-b. Since the body 210 provides airflow to each suction cup 102a-b, a single air hose plug can be used to attach to the pressurized air source. This beneficially allows a single air hose to be used for a plurality of pressure points. However, within other examples systems 202a-b each includes a separate air hose plug.

Although the example of FIG. 7 includes two systems for attaching to a surface and applying a calibrated load, it should be understood that system 200 may include additional systems for attaching to a surface and applying a calibrated load (e.g., 3, 4, 5, 6, etc).

In practice, a plurality of systems 100 and/or systems 200 can be combined with one another to apply pressure to surfaces of various shapes and sizes, including uneven surfaces. Systems 100 and/or 200 can be positioned in any desired arrangement, so long as each respective suction cup 102a-b can attach to a respective attachment area 104a-b near the working surface 108a-b. The disclosed systems 100 and 200 thus allow for tailoring the one or more points of applied load to the particular surface being worked on.

Figure 8:
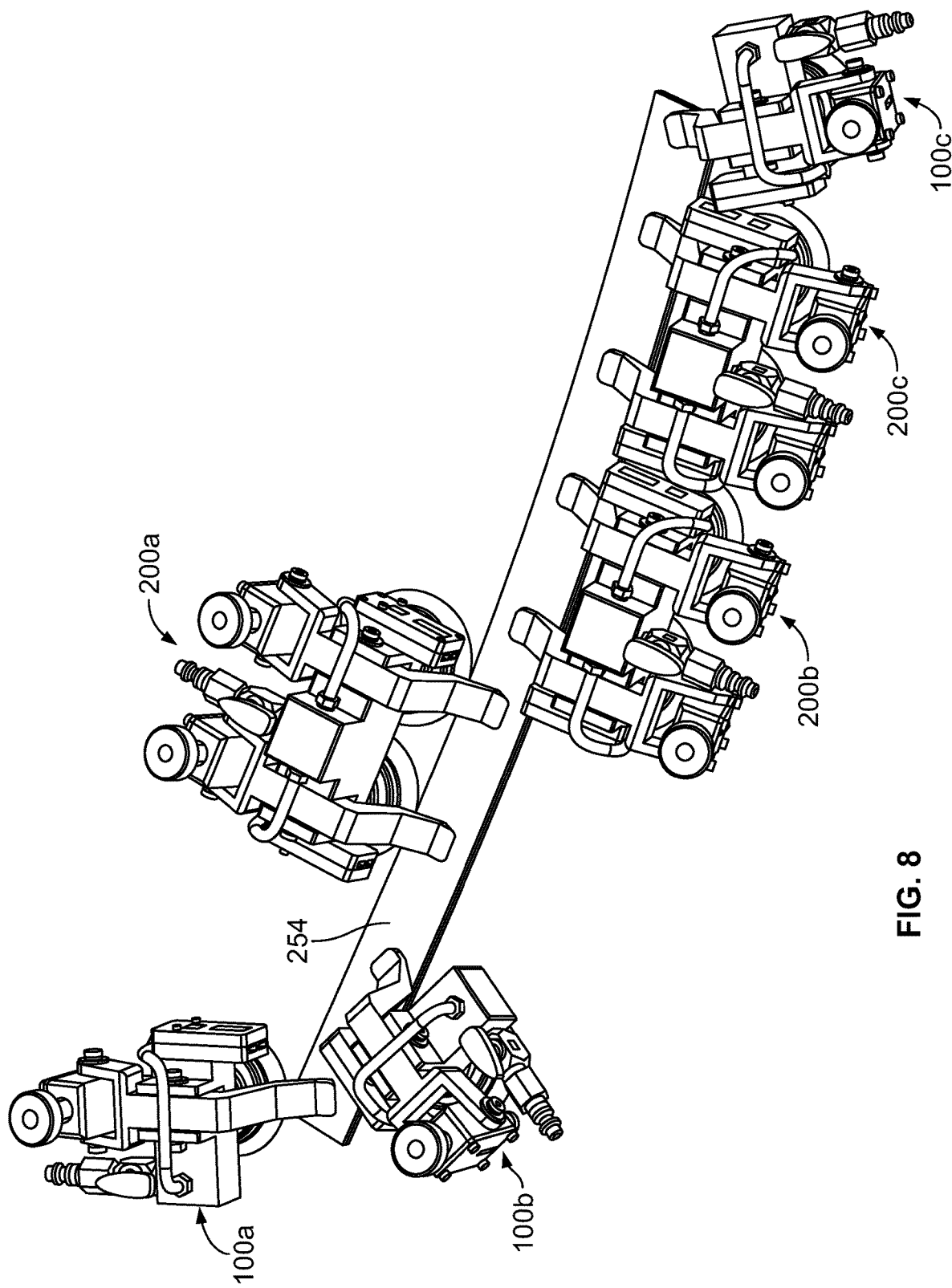
FIG. 8 illustrates a top view of a plurality of systems applying load to a caul plate, according to an example implementation.

FIG. 8 illustrates an example in which numerous systems are applying pressure to a long caul plate, according to an example implementation. In particular, FIG. 8 illustrates systems 100a-c and systems 200a-c applying pressure to a caul plate 254. In an example, the caul plate 254 distributes pressure over a wear strip on a body of an aircraft. Caul plate 254 may be placed over the wear strip, and each system includes a pressure foot that applies pressure to the caul plate 254. In an example embodiment, the surfaces to which the systems 100a-c and 200a-c attach may be uneven. For instance, the surface to which systems 100a and 200a are attached may not be even with the surface to which systems 100b-c and 200b-c are attached.

Figure 9:
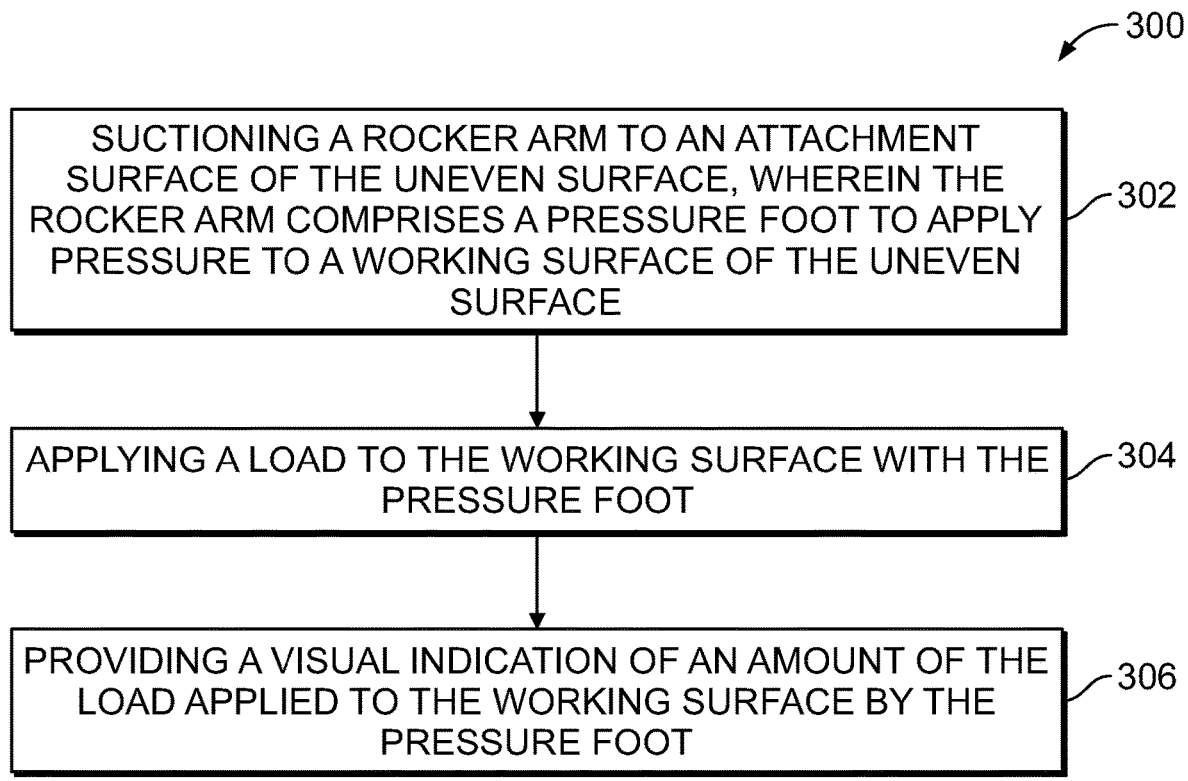
FIG. 9 shows a flowchart of an example method for applying a load to an uneven surface, according to an example implementation.

FIG. 9 shows a flowchart of an example of a method 300 for applying a load to an uneven surface, according to an example implementation. Method 300 shown in FIG. 9 presents an example of a method that could be used with the system 100 shown in FIGS. 1A-B and/or the system 200 shown in FIG. 7, for example. In some instances, components of the disclosed systems may be configured to perform the functions such that the components are actually configured and structured to enable such performance. In other examples, components of the disclosed systems may be arranged to be adapted to, capable of, or suited for performing the functions, such as when operated in a specific manner. Method 300 may include one or more operations, functions, or actions as illustrated by one or more of blocks 302-306. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes suctioning rocker arm 106 to attachment surface 104 of the uneven surface, wherein the rocker arm 106 comprises pressure foot 114 to apply pressure to working surface 108 of the uneven surface. Within examples, suctioning the rocker arm 106 to attachment surface 104 includes suction cup 102 attaching to the attachment surface 104 and air from a pressurized air source generating a vacuum for the suction cup 102.

At block 304, the method 300 includes applying a load to the working surface 108 with the pressure foot 114. At block 306, the method 300 includes providing a visual indication of an amount of the load applied to the working surface 108 by the pressure foot 114.

Figure 10:
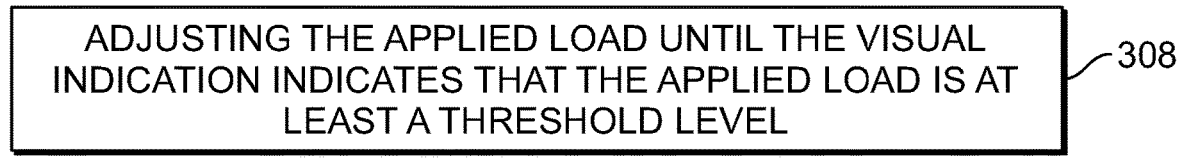
FIG. 10 shows a flowchart of an example method for use with the method of FIG. 9, according to an example implementation.

FIG. 10 shows a flowchart of an example method for use with the method 300, according to an example implementation. At block 308, the method 300 includes adjusting the applied load until the visual indication indicates that the applied load is at least a threshold level. For instance, adjustment screw 126 can be turned to increase the applied load until the indicator pin 136 is aligned with or positioned above the at least one indicator line 134.

Example systems and method described herein provide improved systems and methods for attaching to an uneven surface and applying a load. The disclosed system beneficially provides an improved system for attaching to a surface and applying a calibrated load that is capable of attaching to uneven surfaces for which conventional systems (e.g., vacuum bags and repair devices utilizing weights) are not suitable. Further, the disclosed systems provide a visual indication of an amount of the load applied, which helps to ensure that the desired load is provided and/or maintained (e.g., during an entire curing process).

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

As used herein, the term "about" in association with a numerical value means that the value varies up or down by 5%. For example, for a value of about 100, means 95 to 105 (or any value between 95 and 105).

Different examples of the system(s) and method(s) disclosed herein include a variety of components, features, and functionalities. It should be understood that the various examples of the system(s) and method(s) disclosed herein may include any of the components, features, and functionalities of any of the other examples of the system(s) and method(s) disclosed herein in any combination, and all of such possibilities are intended to be within the scope of the disclosure.

Additionally, although the disclosed methods and systems are described primarily with reference to applying load to aircrafts during a curing process, it should be understood that the disclosed systems and methods may be used for other systems and processes as well. Within examples, the disclosed systems and methods may be used for applying load to many different types of vehicles or systems, including an aerial vehicle including a winged aerial vehicle, an unmanned aerial vehicle (UAV), a drone, a rotorcraft device, a multicopter, an autonomously driven vehicle, a land vehicle, a water vehicle, a water submersible vehicle, and/or manufacturing systems/equipment, among other possibilities.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A system for attaching to a surface and applying a calibrated load, the system comprising:
    a suction cup to attach to an attachment surface;
    a rocker arm to apply a load to a working surface, wherein the rocker arm is coupled to the suction cup and comprises a portion extending over the suction cup to apply pressure over the suction cup; and
    a force scale coupled to the rocker arm to provide an indication of an amount of the load applied to the working surface by the rocker arm, wherein the force scale includes an adjustment screw and rotation of the adjustment screw changes the load applied to the working surface by the rocker arm.

2. The system of claim 1, wherein the rocker arm comprises a pressure foot to abut the working surface, wherein the pressure foot is positioned on a first end of the rocker arm, and wherein the force scale is attached to a second end of the rocker arm.

3. The system of claim 1, wherein the force scale comprises a pressure foot to abut the working surface.

4. The system of claim 1, wherein the force scale comprises:
    a foot;
    a compression spring;
    a sliding block; and
    the adjustment screw to force the sliding block to compress the compression spring when the foot abuts a contact surface, wherein an amount of compression of the compression spring is correlated with the amount of the load applied to the working surface by the rocker arm.

5. The system of claim 4, wherein the sliding block is threadedly attached to the adjustment screw.

6. The system of claim 4, wherein the force scale further comprises a main body having at least one indicator line positioned on the main body to indicate an amount of applied load,
    wherein the sliding block is moveable relative to the main body, and
    wherein the sliding block comprises an indicator pin to show a position of the sliding block relative to the at least one indicator line.

7. The system of claim 4, wherein the foot comprises a swivel foot to abut contact surfaces of different angles.

8. The system of claim 1, wherein the force scale is hingedly attached to the rocker arm.

9. The system of claim 1, wherein the portion of the rocker arm extending over the suction cup extends substantially parallel to a main axis of the suction cup, such that the portion extending over the suction cup applies pressure substantially perpendicular to the suction cup when the load is applied to the working surface by the rocker arm.

10. The system of claim 1, further comprising:
    an air hose plug to attach to a pressurized air source; and
    a body to provide an airflow path from the air hose plug to the suction cup, whereby air flowing through the body generates a vacuum for the suction cup.

11. The system of claim 1, further comprising vacuum bag seal material applied to outer edges of the suction cup.

12. A system comprising:
    a plurality of systems for attaching to a surface and applying a calibrated load, wherein each system for attaching to a surface and applying a calibrated load comprises:
        (i) a suction cup to attach to an attachment surface;
        (ii) a rocker arm to apply a load to a working surface, wherein the rocker arm is coupled to the suction cup and comprises a portion extending over the suction cup to apply pressure over the suction cup; and
        (iii) a force scale coupled to the rocker arm to provide an indication of an amount of the load applied to the working surface by the rocker arm; and
    at least one air hose plug to attach to a pressurized air source.

13. The system of claim 12, further comprising a body to provide an airflow path from the at least one air hose plug to each of the suction cups, wherein the at least one air hose plug is attached to the body.

14. The system of claim 12, wherein each force scale comprises:
a foot;
a compression spring;
a sliding block; and
an adjustment screw to force the sliding block to compress the compression spring when the foot abuts a contact surface, wherein an amount of compression of the compression spring is correlated with the amount of the load applied to the working surface by the rocker arm.

15. The system of claim 14, wherein the force scale further comprises a main body having at least one indicator line positioned on the main body to indicate an amount of applied load,
wherein the sliding block is moveable relative to the main body, and
wherein the sliding block comprises an indicator pin to show a position of the sliding block relative to the at least one indicator line.

16. The system of claim 14, wherein the force scale is hingedly attached to the rocker arm.

17. The system of claim 12, wherein, for each system for attaching to a surface and applying a calibrated load, the portion of the rocker arm extending over the suction cup extends substantially parallel to a main axis of the suction cup, such that the portion extending over the suction cup applies pressure substantially perpendicular to the suction cup when the load is applied to the working surface by the rocker arm.

18. A method for applying a load to an uneven surface, the method comprising:
suctioning a rocker arm to an attachment surface of the uneven surface, wherein the rocker arm comprises a pressure foot to apply pressure to a working surface of the uneven surface;
applying a load to the working surface with the pressure foot; and
providing a visual indication of an amount of the load applied to the working surface by the pressure foot.

19. The method of claim 18, wherein suctioning a rocker arm to an attachment surface of the uneven surface comprises:
a suction cup attaching to the attachment surface; and
a pressurized air source generating a vacuum for the suction cup.

20. The method of claim 18, further comprising adjusting the applied load until the visual indication indicates that the applied load is at least a threshold level.

* * * * *